US008529676B2

(12) United States Patent
Sugiura

(10) Patent No.: US 8,529,676 B2
(45) Date of Patent: Sep. 10, 2013

(54) FUEL VAPOR ADSORPTION CANISTER

(75) Inventor: Masahiro Sugiura, Anjo (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 118 days.

(21) Appl. No.: 13/078,690

(22) Filed: Apr. 1, 2011

(65) Prior Publication Data

US 2011/0240490 A1 Oct. 6, 2011

(30) Foreign Application Priority Data

Apr. 2, 2010 (JP) ................................. 2010-085779

(51) Int. Cl.
*B01D 53/02* (2006.01)

(52) U.S. Cl.
USPC ................. 96/137; 123/519; 96/139; 96/141; 96/142; 96/144; 96/149; 96/152

(58) Field of Classification Search
USPC ........................................................... 96/108
See application file for complete search history.

(56) References Cited

U.S. PATENT DOCUMENTS

| | | | | | |
|---|---|---|---|---|---|
| 3,476,524 | A | * | 11/1969 | Burke | 422/170 |
| 4,207,084 | A | * | 6/1980 | Gardner | 96/113 |
| 4,386,947 | A | * | 6/1983 | Mizuno et al. | 96/137 |
| 4,717,401 | A | | 1/1988 | Lupoli et al. | |
| 4,877,001 | A | * | 10/1989 | Kenealy et al. | 123/519 |
| 6,524,374 | B2 | * | 2/2003 | Moriyama et al. | 96/131 |
| 6,540,815 | B1 | * | 4/2003 | Hiltzik et al. | 95/146 |
| RE38,844 | E | * | 10/2005 | Hiltzik et al. | 95/146 |
| 6,959,698 | B2 | * | 11/2005 | Ikuma et al. | 123/519 |
| 8,276,569 | B2 | * | 10/2012 | Kosugi | 123/519 |
| 2008/0110440 | A1 | * | 5/2008 | Oh et al. | 123/519 |
| 2009/0056827 | A1 | * | 3/2009 | Tschantz | 141/45 |
| 2011/0150739 | A1 | * | 6/2011 | Seliger et al. | 423/341 |
| 2011/0168025 | A1 | * | 7/2011 | Huynh | 96/126 |

FOREIGN PATENT DOCUMENTS

| | | | |
|---|---|---|---|
| CA | 1291381 | C | 10/1991 |
| JP | 63179173 | | 7/1988 |
| JP | 2001-323845 | | 11/2001 |
| JP | 2004332694 | | 11/2004 |
| JP | 2005-023835 | | 1/2005 |

OTHER PUBLICATIONS

Japanese Office Action mailed Jul. 30, 2013, corresponding to Japanese Patent Application No. 2010-085779; with English language translation.

* cited by examiner

*Primary Examiner* — Duane Smith
*Assistant Examiner* — Cabrena Hall
(74) *Attorney, Agent, or Firm* — Ladas & Parry, LLP

(57) ABSTRACT

A canister for trapping a fuel vapor vaporized in a fuel tank has a casing defining an adsorption chamber therein, an adsorbent capable of adsorbing the fuel vapor and filled in the adsorption chamber and a flow regulation plate disposed in the casing. The casing has a fuel introducing port configured to introduce the fuel vapor from the fuel tank into the adsorption chamber, and an air communicating port communicating the adsorption chamber with the atmosphere. The air communicating port is formed on a side surface of the casing extending in a direction of gravitational force. The flow regulation plate disposed at an end of the adsorption chamber near the air communicating port and has an opening configured to communicate the adsorption chamber with the air communicating port. The opening is positioned above the air communicating port in the direction of gravitational force.

2 Claims, 3 Drawing Sheets

FUEL VAPOR ADSORPTION CANISTER

This application claims priority to Japanese Patent Application Serial Number 2010-085779, the contents of which are incorporated herein by reference.

BACKGROUND OF THE INVENTION

1. Field of the Invention

The present invention relates to canisters trapping fuel vapor vaporized in a fuel tank.

2. Description of the Related Art

A gas vehicle such as automobile is provided with a canister as fuel vapor processor for treating fuel vapor (for example, gasoline vapor) vaporized in a fuel tank. The canister has generally a casing shaped as hollow container, and adsorbents housed in the casing. The casing has a fuel introducing port configured to introduce the fuel vapor vaporized in the fuel tank into the canister, an air communicating port configured to introduce ambient air into the canister, and an exhaust port connected to an air intake pipe for an internal combustion engine. The adsorbents are composed of activated carbon or the like, which can adsorb and desorb the fuel vapor. Thus, the fuel vapor vaporized in the fuel tank flows into the casing through the fuel introducing port and adsorbs onto the adsorbents during parking, etc. Then, ambient air is introduced into the casing through the air communicating port such that the fuel vapor is desorbed from the adsorbents and then is introduced into the engine via the exhaust port together with the air.

When a gas containing the fuel vapor is introduced into an adsorption chamber defined in the casing through the fuel introducing port, the fuel vapor is trapped by the adsorbents in the adsorption chamber. Then, the gas substantially consisting of the air is released into the atmosphere through the air communicating port. However, when a large amount of the fuel vapor flows into the canister during refueling, etc., a portion of the fuel vapor may not adsorb onto the adsorbent and may flow through the canister and into the atmosphere.

Japanese Laid-Open Patent Publication No. 2001-323845 discloses a canister having a plate in a chamber filled with adsorbents. The plate has one or more holes at its upper section for preventing the fuel vapor from passing through the canister and from flowing into the atmosphere. The plate increases airflow resistance in the adsorption chamber so that the fuel vapor remains in the adsorption chamber for a longer time. Accordingly, it is able to increase an adsorption efficiency of the fuel vapor by the adsorbent, resulting in decrease in the fuel vapor released into the atmosphere. However, because some of the adsorbents are disposed between the plate and an air communicating port, the fuel vapor desorbing from such adsorbent may flow into the atmosphere. Therefore, there has been a need in the art for an improved canister.

SUMMARY OF THE INVENTION

In one aspect of the present teachings, a canister for trapping a fuel vapor vaporized in a fuel tank has a casing defining an adsorption chamber therein, an adsorbent capable of adsorbing the fuel vapor and filled in the adsorption chamber and a flow regulation plate disposed in the casing. The casing has a fuel introducing port configured to introduce the fuel vapor from the fuel tank into the adsorption chamber, and an air communicating port communicating the adsorption chamber with the atmosphere. The air communicating port is formed on a side surface of the casing extending in a direction of gravitational force. The flow regulation plate disposed at an end of the adsorption chamber near the air communicating port and has an opening configured to communicate the adsorption chamber with the air communicating port. The opening is positioned above the air communicating port in the direction of gravitational force.

In accordance with this aspect, the fuel vapor in the adsorption chamber must move upwardly in the direction of gravitational force against its own weight for flowing into the atmosphere via the air communicating port, so that it is able to substantially prevent the fuel vapor in the adsorption chamber from flowing into the atmosphere. In addition, because the flow regulation plate increases a flow resistance in the adsorption chamber, the fuel vapor remains in the adsorption chamber for a longer time. Thus, it is able to improve adsorption efficiency of the fuel vapor. Furthermore, the flow regulation plate guide the fuel vapor upwardly toward its opening, so that it is able to increase area where the fuel vapor flows through.

DETAILED DESCRIPTION OF THE INVENTION

Each of the additional features and teachings disclosed above and below may be utilized separately or in conjunction with other features and teachings to provide improved canisters. Representative examples of the present invention, which examples utilized many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A first embodiment of this disclosure will be described with reference to accompanying drawings. A canister described below corresponds to a fuel vapor processor mounted on a gas vehicle or the like and is configured to temporarily trap fuel vapor (such as gasoline vapor) vaporized in a fuel tank. Here, when directions are not defined specifically, terms "upward" and "downward" intend to mean "upward" direction and "downward direction" in the direction of gravitational force, respectively. In addition, flow directions "upstream" and "downstream" are defined based on a flow of the fuel vapor flowing through a fuel introducing port, one or more adsorption chambers and an air communicating port of a canister.

Figure 1:
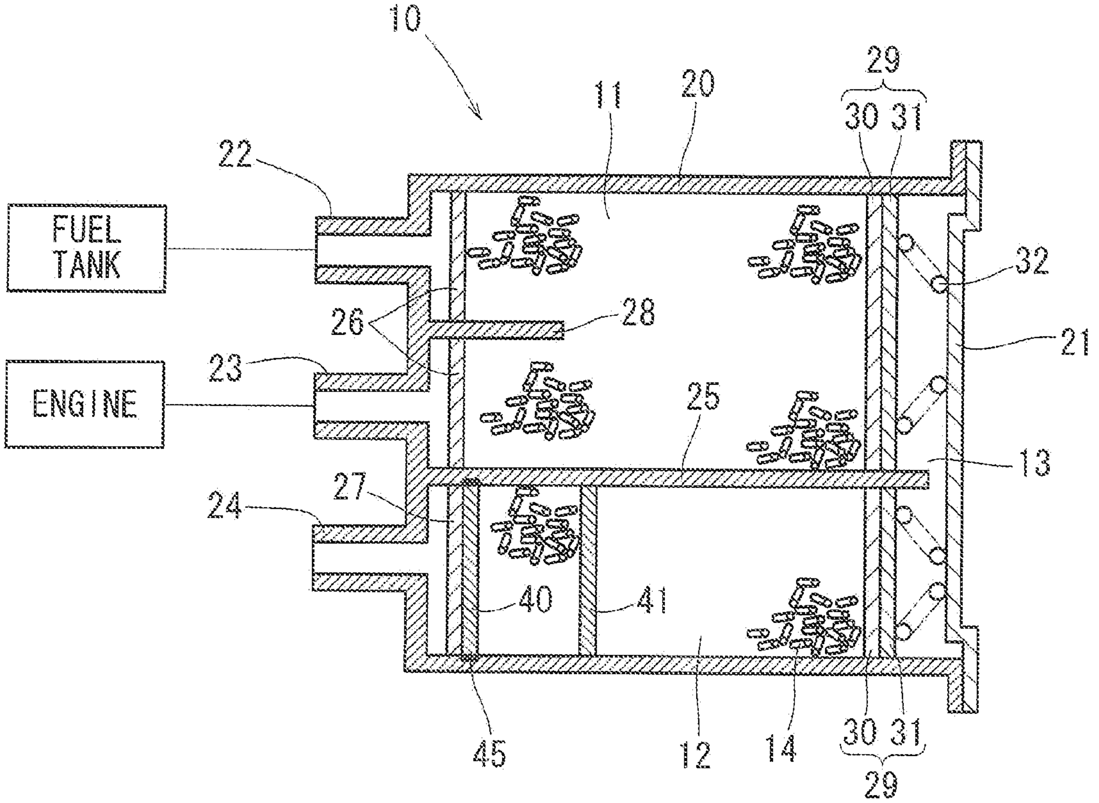
FIG. 1 is a horizontal cross-sectional view of a canister of a first embodiment.

Firstly, a canister 10 will be described in reference to FIG. 1. FIG. 1 is a horizontal cross-sectional view of the canister 10. The canister 10 is configured to temporarily trap fuel vapor vaporized in a fuel tank. The canister 10 has a casing 20 having an opening and a lid 21 configured to close the opening.

The casing 20 is shaped as a hollow container as shown in FIG. 1. The casing 20 has three ports each communicating inside and outside of the casing 20. One of the ports is a fuel introducing port 22 for introducing the fuel vapor vaporized in the fuel tank into the canister 10. The fuel introducing port 22 is communicated with the fuel tank via a pipe. Another one of the ports is an exhaust port 23 for discharging the fuel vapor from the canister 10. The fuel introducing port 22 and the exhaust port 23 are formed alongside on one wall portion of the casing 20. The exhaust port 23 is communicated with an air intake pipe of an engine or the like via a pipe. The other of the ports is an air communicating port 24 for releasing air after removing the fuel vapor and for introducing ambient air into the canister 10. The air communicating port 24 is communicated with a fresh air inlet (not shown) for introducing ambient air.

The casing 20 has a partition wall 25 dividing an inner space of the casing 20 into a first adsorption chamber 11 and a second adsorption chamber 12. The partition wall 25 is formed integrally with the casing 20. The first adsorption chamber 11 is communicated with the fuel introducing port 22 and the exhaust port 23 via a filter 26. On the other hand, the second adsorption chamber 12 is communicated with the air communicating port 24 via a filter 27. The first adsorption chamber 11 and the second adsorption chamber 12 are communicated with each other via a communicating chamber 13, which is defined on the side opposite to the fuel introducing port 22, the exhaust port 23 and the air communicating port 24.

The casing 20 has a partition 28 protruding from the wall portion toward a center of the first adsorption chamber 11 such that the partition 28 divides the first adsorption chamber 11 into a first section near and directly communicating with the fuel introducing port 22 and a second section near and directly communicating with the exhaust port 23. The partition 28 is formed integrally with the casing 20.

The first adsorption chamber 11 and the second adsorption chamber 12 are filled with adsorbents 14 capable of adsorbing and desorbing the fuel vapor. The filter 26 and the filter 27, which are disposed in the first adsorption chamber 11 and the second adsorption chamber 12, respectively, are porous and have a large number of pores smaller than a diameter of the adsorbents 14. Thus, it is able to hold the adsorbents 14 in the first adsorption chamber 11 and the second adsorption chamber 12.

The first adsorption chamber 11 of the casing 20 has an opening side opposite to the fuel introducing port 22 and the exhaust port 23. And, the opening side is closed with an inner lid 29. Here, an opening side of the second adsorption chamber 12 is also closed with another inner lid 29. Because configurations of the inner lids 29 for the first adsorption chamber 11 and the second adsorption chamber 12 are substantially same, the inner lid 29 for the first adsorption chamber 11 will be described, whereas the inner lid 29 for the second adsorption chamber 12 will not be described.

The inner lid 29 is composed of a filter 30 and a porous plate 31 and allows air to pass therethrough. And, the inner lid 29 holds the adsorbents 14 in the first adsorption chamber 11. The inner lid 29 is configured to move slidably along an inner surface of the canister 20 while closing the opening side of the first adsorption chamber 11. Between the inner lid 29 and the lid 21 a coil spring 32 is provided such that one end of the coil spring 32 is connected to the inner lid 29 and the other end of the coil spring 32 is connected to the lid 21. Accordingly, when the opening of the casing 20 is closed with the lid 21, the inner lid 29 is pressed toward the first adsorption chamber 11 by the coil spring 32. Therefore, it is able to prevent generation of unnecessary space between particles of the adsorbents 14 in order to keep the flow resistance constant in the first adsorption chamber 11.

For trapping the fuel vapor in the canister 10, the fuel vapor is introduced into the casing 20 via the fuel introducing port 22, and is flowed through the first adsorption chamber 11, the communicating chamber 13 and the second adsorption chamber 12, and then is discharged from the canister 20 via the air communicating port 24. The partition 28 prevent the fuel vapor introduced into the first adsorption chamber 11 through the fuel introducing port 22 from flowing out through the exhaust port 23. On the other hand, for removing the fuel vapor from the canister 20, air (ambient air) is introduced into the casing 20 through the air communicating port 24, and is flowed through the second adsorption chamber 12, the communicating chamber 13 and the first adsorption chamber 11, and then is discharged through the exhaust port 23. That is, this canister 10 has a U-shaped flow pathway. In addition, the canister 20 is mounted horizontally on a bottom surface of a vehicle body. Thus, when the fuel vapor flows from the fuel introducing port 22 to the air communicating port 24, the fuel vapor flows in a substantially horizontal direction.

Figure 2:
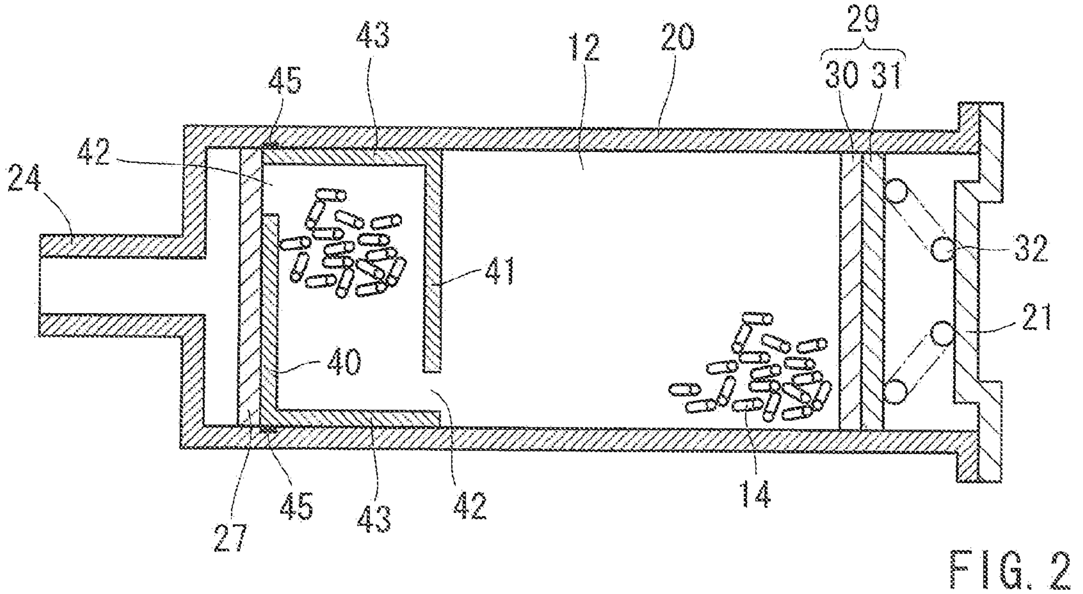
FIG. 2 is a vertical cross-sectional view of the canister of the first embodiment.
Figure 3:
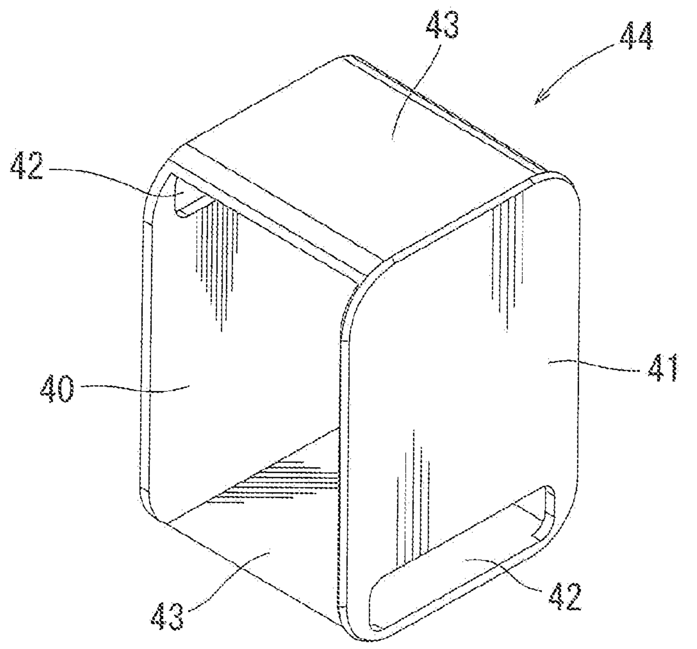
FIG. 3 is a perspective view of a flow regulation unit of the first embodiment.

As shown in FIG. 1 and FIG. 2, a first flow regulation plate 40 is disposed in the second adsorption chamber 12 along the filter 27. The first flow regulation plate 40 has an elongated opening 42 extending in a horizontal direction and positioned near an upper end of the flow regulation plate 40 such that spaces at each side of the first flow regulation plate 40 are communicated with each other via the opening 42. The first flow regulation plate 40 regulates a flow of the fuel vapor toward the air communicating port 24 in the second adsorption chamber 12. Thus, the fuel vapor remains in the second adsorption chamber 12 for a longer time, and diffuses in a larger area of the second adsorption chamber 12, so that it is able to efficiently adsorb the fuel vapor onto the adsorbents 14. The first flow regulation plate 40 is positioned at one end space of the second adsorption chamber 12 near the air communicating port 24 and along the filter 27. The opening 42 is formed on an upper portion of the first flow regulation plate 40 in the direction of gravitational force. Accordingly, the fuel vapor flowing into the second adsorption chamber 12 must move upwardly against its own weight to the opening 42 positioned above the air communicating port 24 in order to flow out through the air communicating port 24. This upward moving distance is increased due to provision of the first flow regulation plate 40, so that it is more difficult for the fuel vapor to flow into the atmosphere from the second adsorption chamber 12 than a case without the first flow regulation plate 40. In addition, because the first flow regulation plate 40 makes the fuel vapor flow upwardly, the fuel vapor can reach areas, which the fuel vapor cannot reach without any flow regulator such as the first flow regulation plate 40. Therefore, because a larger amount of the adsorbents 14 can adsorb the fuel vapor, the canister 10 can trap the fuel vapor more efficiently.

In a case that adsorbents are disposed between the first flow regulation plate 40 and the air communicating port 24, the fuel vapor can flow through the air communicating port 24 and into the atmosphere just after desorbing from such adsorbents. However, in this embodiment, the first flow regulation plate 40 is disposed at the end space of the second adsorption chamber 12, and thus is disposed between the air communicating port 24 and the adsorbents 14 filled in the second adsorption chamber 12. Accordingly, the fuel vapor desorbing from the adsorbents 14 in the second adsorption chamber 12 must move upwardly to the opening 42 in the second adsorption chamber 12, and most of the fuel vapor may adsorb onto the adsorbents 14 again in the second adsorption chamber 12 during upward movement. Therefore, it is able to decrease the fuel vapor flowing out of the air communicating port 24.

In the second adsorption chamber 12, a second flow regulation plate 41 is disposed upstream from the first flow regulation plate 40. The first flow regulation plate 40 has the opening 42 above the air communicating port 24 in the direction of gravitational force, whereas the second flow regulation plate 41 has an opening 42 below the air communicating port 24 in the direction of gravitational force. Accordingly, the fuel vapor flows through both of the openings 42 in the second adsorption chamber 12, so that the moving distance of the fuel vapor in the second adsorption chamber 12 is increased due to provision of the first and the second fuel regulation plates 40 and 41. Therefore, the fuel vapor contacts with a larger amount of the adsorbents 14, so that it is able to efficiently adsorb the fuel vapor onto the adsorbents 14.

In this embodiment, the first flow regulation plate 40 and the second flow regulation plate 41 are connected each other by connection portions 43 and are integrally constructed of a resin as a flow regulation unit 44. Thus, it is able to easily place the first and the second flow regulation plates 40 and 41 in the second adsorption chamber 12 and to adequately keep a distance between the first and the second flow regulation plates 40 and 41 at a predetermined distance. In addition, the flow regulation unit 44 has a seal member 45 such as O-ring along an outer circumference of the flow regulation unit 44. When the flow regulation unit 44 is disposed in the second adsorption chamber 12, the seal member 45 sealingly contacts with both an inner surface of the casing 20 and the partition wall 25. Thus, it is able to prevent the fuel vapor from flowing between the outer circumference of the flow regulation unit 44 and either the inner surface of the casing 20 or the partition wall 25.

The adsorbents 14 filled in the first adsorption chamber 11 and the second adsorption chamber 12 are composed of activated carbon capable of adsorbing the fuel vapor, such as extruded activated carbon or granular activated carbon. Here, the granular activated carbon has smaller diameter than the extruded activated carbon. The extruded activated carbon combines powdered activated carbon with binder, which are generally extruded into a cylindrical shape. The diameter of the granular activated carbon is about 0.7-2.0 mm, whereas the diameter of the extruded activated carbon is about 2.0-2.5 mm.

In this embodiment, the first flow regulation plate 40 and the second flow regulation plate 41 increase the flow resistance in the second adsorption chamber 12. Accordingly, the adsorbents 14 are composed of the extruded activated carbon having larger diameter in order to decrease the flow resistance such that it is able to prevent excessive retention of the fuel vapor in the casing 20. In addition, in a case that the flow resistance in the second adsorption chamber 12 is excessively high, it is not able to introduce the fuel vapor into the canister 10 from the fuel tank adequately and an inner pressure of the fuel tank does not decrease adequately. As a result, it may be difficult to refuel the fuel tank due to the excessively elevated inner pressure of the fuel tank. However, use of the extruded activated carbon decreases the flow resistance in the second adsorption chamber 12, and thus can resolve such problem.

The adsorbents 14 filled in the first adsorption chamber 11 and the second adsorption chamber 12 can be mixed with heat storage materials. Various materials can be used as the heat storage materials, for example phase-change heat storage materials capable of absorbing and releasing heat depending on changes in temperature. Furthermore, the heat storage materials can be constructed in a granular shape of a mixture of binders and microcapsules containing phase-change heat storage materials therein.

Figure 4:
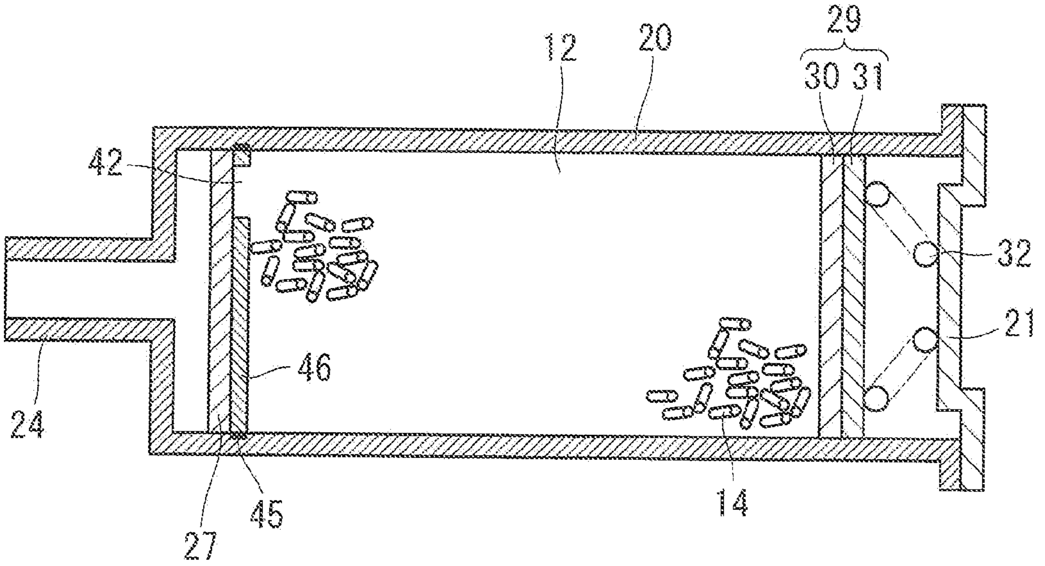
FIG. 4 is a vertical cross-sectional view of the canister of a second embodiment.

In a second embodiment, one flow regulation plate 46 is disposed in the second adsorption chamber 12 as shown in FIG. 4. The flow regulation plate 46 is positioned at an end near the air communicating port 24 in the second adsorption chamber 12, i.e., at the most downstream position in the second adsorption chamber 12. The flow regulation plate 46 has an opening 42 above the air communicating port 24 in the direction of gravitational force. Accordingly, the flow regulation chamber 46 can regulate a flow of the fuel vapor in the second adsorption chamber 12 and prevent the fuel vapor in the second adsorption chamber 12 from flowing into the atmosphere via the air communicating port 24 like the first flow regulation plate 40 of the first embodiment. Here, because other configurations of the second embodiment are same as or similar to those of the first embodiment, they are labeled with the same reference numbers as those of the first embodiment, respectively, and will not be described.

Figure 5:
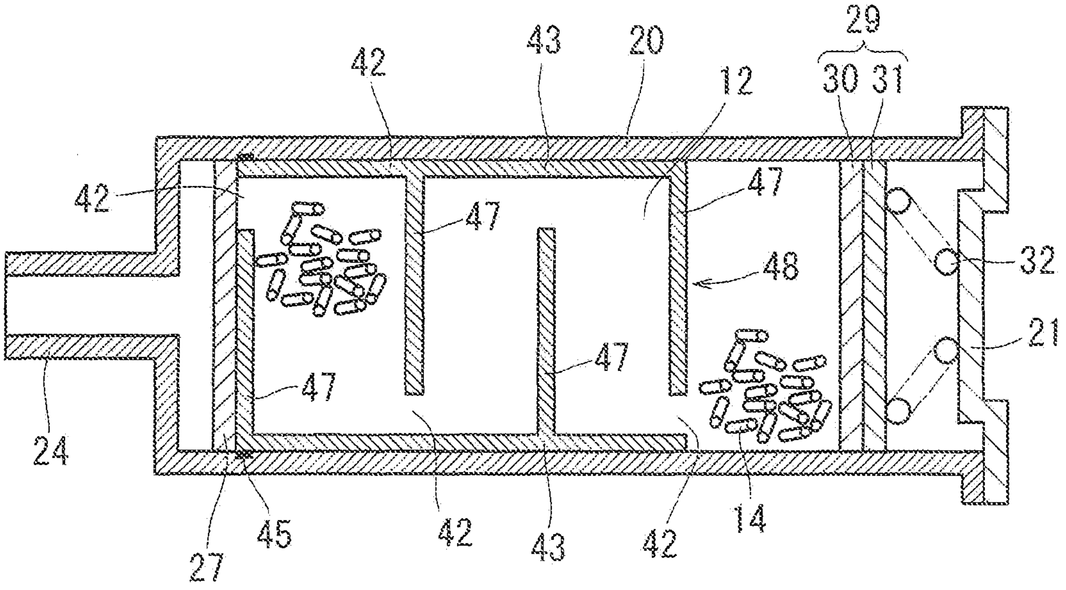
FIG. 5 is a vertical cross-sectional view of the canister of a third embodiment.

In a third embodiment, a flow regulation unit 48 having four flow regulation plates 47 parallel to each other is disposed in the second adsorption chamber 12 as shown in FIG. 5. Each of the first and the third flow regulation plates 47 along a flow direction of the fuel vapor in the canister 10 (in a direction from right to left in FIG. 5) has an opening 42 at a lower portion, i.e., below the air communicating port 24 in the direction of gravitational force, on the other hand, each of the second and the fourth flow regulation plates 47 has an opening 42 at an upper portion, i.e., above the air communicating port in the direction of gravitational force. And, the opening 42 of the fourth flow regulation plate 47, which is disposed at the most downstream in the flow direction, is positioned above the air communicating port 48. Therefore, the openings 42 of the flow regulation plates 47 are positioned alternately at the upper portions and the lower portions, i.e., above and below the air communicating port 24. Accordingly, the flow regulation unit 48 can regulate the flow of the fuel vapor in the second adsorption chamber 12 and prevent the fuel vapor desorbing from the adsorbents 14 from flowing into the atmosphere through the air communicating port 24. In addition, the flow regulation unit 48 increases the moving distance of the fuel vapor in the second adsorption chamber 12, so that it is able to adsorb the fuel vapor onto the adsorbents more efficiently.

In accordance with the canister 10 of this embodiment, a plurality of the flow regulation plates are formed integrally and used as a single unit, so that it is able to easily change the flow resistance in the adsorption chambers by exchanging the flow regulation unit without changing shape of the casing 20. Thus, it is able to provide the canister 10 suitable performance depending on a type of a vehicle and usage environment by only change of the flow regulation unit.

In other embodiments, the number of the flow regulation plates is not limited to one, two or four, and can be increased or decreased.

The casing 20, the flow regulation plates and the flow regulation unit can be formed integrally in order to decrease the number of parts and to simplify manufacturing process.

In the above-described embodiments, the opening 42 is formed in the elongated shape. However, the opening 42 can be formed in other shapes such as a plurality of bores.

In the above-described embodiments, the adsorbents 14 are composed of the extruded activated carbons. However, the granular activated carbon having smaller diameter can be filled in at least one of the first adsorption chamber 11 and the second adsorption chamber 12 instead of the extruded activated carbon in order to provide a preferred flow resistance.

The invention claimed is:

1. A canister for trapping a fuel vapor vaporized in a fuel tank, comprising:

a casing defining an adsorption chamber therein and having a fuel introducing port configured to introduce the fuel vapor from the fuel tank into the adsorption chamber, and an air communicating port communicating the adsorption chamber with the atmosphere, the air communicating port being formed on a side surface of the casing extending in a direction of gravitational force;

an adsorbent capable of adsorbing the fuel vapor and filled in the adsorption chamber;

a flow regulation plate defining a furthermost end on the side of the air communicating port of the adsorption chamber communicating with the air communicating port, the flow regulation plate having an opening communicating the adsorption chamber with the air communicating port, the opening being positioned above the air communicating port in the direction of gravitational force; and no adsorbent being filled between the flow regulation plate and the air communicating port; and at least one additional flow regulation plate disposed upstream of the flow regulation plate in a flow pathway of the fuel vapor from the fuel introducing port to the air communicating port in the casing and having an opening, wherein the additional flow regulation plate has an opening such that the openings of the flow regulation plate and the additional flow regulation plate are alternately positioned above and below the air communicating port in the direction of gravitational force.

2. The canister as defined in claim 1, wherein the adsorbent is composed of extruded activated carbon.

* * * * *